(12) United States Patent
Poplawski et al.

(10) Patent No.: US 10,317,919 B2
(45) Date of Patent: Jun. 11, 2019

(54) TAMPER RESISTANT THERMOSTAT HAVING HIDDEN LIMIT ADJUSTMENT CAPABILITIES

(71) Applicant: Braeburn Systems LLC, Montgomery, IL (US)

(72) Inventors: Daniel Poplawski, Oswego, IL (US); Robert Rados, Yorkville, IL (US)

(73) Assignee: Braeburn Systems LLC, Montgomery, IL (US)

( * ) Notice: Subject to any disclaimer, the term of this patent is extended or adjusted under 35 U.S.C. 154(b) by 294 days.

(21) Appl. No.: 15/183,757

(22) Filed: Jun. 15, 2016

(65) Prior Publication Data

US 2017/0364104 A1    Dec. 21, 2017

(51) Int. Cl.
| G05D 23/00 | (2006.01) |
| G05D 23/19 | (2006.01) |
| F24F 11/30 | (2018.01) |
| G05B 15/02 | (2006.01) |
| G06F 3/16 | (2006.01) |
| F24F 11/52 | (2018.01) |

(52) U.S. Cl.
CPC .......... G05D 23/1917 (2013.01); F24F 11/30 (2018.01); G05B 15/02 (2013.01); G06F 3/167 (2013.01); *F24F 11/52* (2018.01)

(58) Field of Classification Search
CPC combination set(s) only.
See application file for complete search history.

(56) References Cited

U.S. PATENT DOCUMENTS

| 2,054,039 A | 9/1936 | Persons |
| 2,060,636 A | 11/1936 | Persons |
| 2,253,418 A | 8/1941 | Crandall et al. |

(Continued)

FOREIGN PATENT DOCUMENTS

| GB | 2441221 | 2/2006 |
| JP | 58065977 | 4/1983 |

(Continued)

OTHER PUBLICATIONS

Braeburn Systems LLC, "Temperature Limiting Adjustments for Heating and Cooling (1000 Series)", Important Installation Instructions, no date.

(Continued)

*Primary Examiner* — Ponnoreay Pich
(74) *Attorney, Agent, or Firm* — The Law Offices of Konrad Sherinian, LLC

(57) ABSTRACT

A thermostat resists tampering by including a hidden mechanism for switching from a limit setting mode to an operation mode. In some embodiments, the switching mechanism is in the form of a tamper proof switch or jumper on the thermostat's circuit board. The switching mechanism can be hidden from a potential non-administrative user and can be located on the circuit board of the thermostat, as opposed to on the external housing. While the switching mechanism is in limit setting mode, the limits of the thermostat's temperature range can be adjusted. Once these limits have been set, the adjuster can move the switching mechanism to operation mode, and the thermostat will now be able to maintain temperatures within the new limit settings.

20 Claims, 6 Drawing Sheets

(56) References Cited

U.S. PATENT DOCUMENTS

| | | | |
|---|---|---|---|
| 2,703,228 A | 3/1955 | Fleisher | |
| 3,309,021 A | 3/1967 | Powers | |
| 3,385,574 A | 5/1968 | Lohman | |
| 3,481,588 A | 12/1969 | Lobb | |
| 3,705,479 A | 12/1972 | Mcpherson | |
| 3,724,824 A | 4/1973 | Mitich | |
| 3,733,062 A | 5/1973 | Bracich | |
| 3,774,588 A | 11/1973 | Yeagle | |
| 3,799,517 A | 3/1974 | Tamm | |
| 3,823,922 A | 7/1974 | McElreath | |
| 3,983,928 A * | 10/1976 | Barnes | G05D 23/32 165/238 |
| 4,036,597 A | 7/1977 | Filss | |
| 4,056,582 A | 11/1977 | Chow | |
| 4,075,864 A | 2/1978 | Schrader | |
| 4,185,687 A | 1/1980 | Stockman | |
| 4,316,256 A | 2/1982 | Hendricks et al. | |
| 4,382,544 A | 5/1983 | Stewart | |
| 4,386,649 A * | 6/1983 | Hines | G05D 23/1904 165/239 |
| 4,399,031 A | 8/1983 | Imano et al. | |
| 4,420,794 A * | 12/1983 | Anderson | G07C 9/00944 307/10.5 |
| 4,606,401 A | 8/1986 | Levine | |
| 4,730,941 A | 3/1988 | Levine et al. | |
| 4,733,719 A | 3/1988 | Levine | |
| 4,838,482 A | 6/1989 | Vogelzang | |
| 4,948,040 A | 8/1990 | Kobayashi et al. | |
| 4,967,382 A | 10/1990 | Hall | |
| 5,023,432 A | 6/1991 | Boykin | |
| 5,038,851 A | 8/1991 | Mehta | |
| 5,171,486 A | 12/1992 | Penno | |
| 5,230,482 A | 7/1993 | Ratz et al. | |
| 5,259,445 A | 11/1993 | Pratt et al. | |
| 5,289,362 A | 2/1994 | Liebl et al. | |
| 5,395,042 A * | 3/1995 | Riley | G05D 23/1917 236/46 R |
| 5,428,964 A | 7/1995 | Lobdell | |
| 5,482,209 A | 1/1996 | Cochran et al. | |
| 5,491,615 A | 2/1996 | Nichols | |
| 5,547,017 A | 8/1996 | Rudd | |
| 5,566,879 A | 10/1996 | Longtin | |
| 5,673,850 A | 10/1997 | Uptegraph | |
| 5,697,552 A | 12/1997 | McHugh et al. | |
| 5,765,636 A | 6/1998 | Meyer et al. | |
| 5,782,296 A | 7/1998 | Mehta | |
| 5,795,505 A | 8/1998 | Burns | |
| 5,873,519 A | 2/1999 | Beilfuss | |
| 5,924,486 A | 7/1999 | Ehlers et al. | |
| 5,937,942 A | 8/1999 | Bias et al. | |
| 5,983,146 A | 11/1999 | Sarbach | |
| 6,059,195 A * | 5/2000 | Adams | F23N 5/203 236/20 R |
| 6,116,512 A | 9/2000 | Dushane | |
| 6,196,467 B1 | 3/2001 | Dushane | |
| 6,205,533 B1 | 3/2001 | Margolous et al. | |
| 6,211,782 B1 | 4/2001 | Sandelman et al. | |
| 6,213,404 B1 | 4/2001 | Dushane | |
| 6,241,156 B1 | 6/2001 | Kline et al. | |
| 6,304,803 B1 | 10/2001 | Dao | |
| 6,315,211 B1 | 11/2001 | Sartain | |
| 6,318,639 B1 | 11/2001 | Toth | |
| 6,415,023 B2 | 7/2002 | Iggulden | |
| 6,435,418 B1 | 8/2002 | Toth et al. | |
| 6,458,080 B1 * | 10/2002 | Brown | G06F 19/3481 600/300 |
| 6,478,233 B1 | 11/2002 | Shah | |
| 6,499,038 B2 | 12/2002 | Kitayama | |
| 6,502,758 B2 * | 1/2003 | Cottrell | G05D 23/1904 236/46 R |
| 6,549,870 B2 | 4/2003 | Proffitt et al. | |
| 6,595,430 B1 | 7/2003 | Shah | |
| 6,617,954 B2 | 9/2003 | Firestine | |
| 6,621,507 B1 | 9/2003 | Shah | |
| 6,628,997 B1 | 9/2003 | Fox et al. | |
| 6,714,222 B1 | 3/2004 | Bjorn et al. | |
| 6,783,079 B2 | 8/2004 | Carey et al. | |
| 6,814,299 B1 | 11/2004 | Carey | |
| 6,824,069 B2 | 11/2004 | Rosen | |
| 6,851,621 B1 | 2/2005 | Wacker et al. | |
| 6,892,547 B2 | 5/2005 | Strand | |
| 6,988,671 B2 | 1/2006 | DeLuca | |
| 7,003,378 B2 | 2/2006 | Poth | |
| 7,028,912 B1 | 4/2006 | Rosen | |
| 7,047,092 B2 | 5/2006 | Wimsatt | |
| 7,050,026 B1 | 5/2006 | Rosen | |
| 7,055,759 B2 | 6/2006 | Wacker et al. | |
| D524,663 S | 7/2006 | Moore | |
| D525,154 S | 7/2006 | Moore | |
| D527,288 S | 8/2006 | Moore | |
| D527,658 S | 9/2006 | Moore | |
| D530,633 S | 10/2006 | Moore | |
| 7,114,554 B2 | 10/2006 | Bergman et al. | |
| D531,528 S | 11/2006 | Moore | |
| 7,142,948 B2 | 11/2006 | Metz | |
| D533,793 S | 12/2006 | Moore | |
| D534,088 S | 12/2006 | Moore | |
| 7,146,253 B2 | 12/2006 | Hoog et al. | |
| D534,443 S | 1/2007 | Moore | |
| 7,156,317 B1 | 1/2007 | Moore | |
| 7,156,318 B1 | 1/2007 | Rosen | |
| D536,271 S | 2/2007 | Moore | |
| 7,181,317 B2 | 2/2007 | Amundson et al. | |
| 7,222,800 B2 | 5/2007 | Wruck | |
| 7,225,054 B2 | 5/2007 | Amundson et al. | |
| 7,274,972 B2 | 9/2007 | Amundson et al. | |
| 7,287,709 B2 | 10/2007 | Proffitt et al. | |
| 7,302,642 B2 | 11/2007 | Smith et al. | |
| 7,306,165 B2 | 12/2007 | Shah | |
| 7,320,110 B2 | 1/2008 | Shah | |
| 7,360,717 B2 | 4/2008 | Shah | |
| 7,438,469 B1 | 10/2008 | Moore | |
| 7,454,269 B1 | 11/2008 | Dushane et al. | |
| 7,489,303 B1 | 2/2009 | Pryor | |
| 7,513,438 B2 | 4/2009 | Mueller | |
| 7,556,207 B2 | 7/2009 | Mueller et al. | |
| 7,565,813 B2 | 7/2009 | Pouchak | |
| 7,575,179 B2 | 8/2009 | Morrow et al. | |
| 7,584,897 B2 | 9/2009 | Schultz et al. | |
| 7,593,212 B1 | 9/2009 | Toth | |
| 7,604,046 B2 | 10/2009 | Bergman et al. | |
| 7,614,567 B2 | 11/2009 | Chapman, Jr. et al. | |
| 7,636,604 B2 | 12/2009 | Bergman et al. | |
| 7,693,582 B2 | 4/2010 | Bergman et al. | |
| 7,693,583 B2 | 4/2010 | Wolff et al. | |
| 7,703,694 B2 | 4/2010 | Mueller et al. | |
| 7,706,923 B2 | 4/2010 | Amundson et al. | |
| 7,748,225 B2 | 7/2010 | Butler et al. | |
| 7,702,421 B2 | 8/2010 | Sullivan et al. | |
| 7,775,454 B2 | 8/2010 | Mueller et al. | |
| 7,784,291 B2 | 8/2010 | Butler et al. | |
| 7,784,705 B2 | 8/2010 | Kasper et al. | |
| 7,801,646 B2 | 9/2010 | Amundson et al. | |
| 7,802,618 B2 | 9/2010 | Simon et al. | |
| 7,845,576 B2 | 12/2010 | Siddaramanna | |
| 7,861,941 B2 | 1/2011 | Schultz et al. | |
| 7,867,646 B2 | 1/2011 | Rhodes | |
| 7,941,819 B2 | 5/2011 | Stark | |
| 7,954,726 B2 | 6/2011 | Siddaramanna et al. | |
| 7,963,454 B2 | 6/2011 | Sullivan | |
| D643,318 S | 8/2011 | Morrow | |
| 7,992,794 B2 | 8/2011 | Leen et al. | |
| 8,066,263 B1 | 11/2011 | Soderlund | |
| 8,083,154 B2 | 12/2011 | Schultz et al. | |
| 8,091,795 B1 | 1/2012 | McLellan | |
| 8,167,216 B2 | 5/2012 | Schultz et al. | |
| 8,175,782 B2 | 5/2012 | Gepperth et al. | |
| D662,837 S | 7/2012 | Morrow | |
| D662,838 S | 7/2012 | Morrow | |
| D662,839 S | 7/2012 | Morrow | |
| D662,840 S | 7/2012 | Morrow | |
| D663,224 S | 7/2012 | Morrow | |
| 8,219,251 B2 | 7/2012 | Amundson et al. | |

(56) References Cited

U.S. PATENT DOCUMENTS

| | | |
|---|---|---|
| 8,239,067 B2 | 8/2012 | Amundson et al. |
| 8,239,922 B2 | 8/2012 | Sullivan |
| 8,244,383 B2 | 8/2012 | Bergman et al. |
| 8,280,536 B1 | 10/2012 | Fadell et al. |
| 8,346,396 B2 | 1/2013 | Amundson et al. |
| 8,387,892 B2 | 3/2013 | Koster et al. |
| 8,517,088 B2 | 8/2013 | Moore et al. |
| 8,538,588 B2 | 9/2013 | Kasper |
| 8,549,658 B2 | 10/2013 | Kolavennu et al. |
| 8,620,460 B2 | 12/2013 | Eergman et al. |
| 8,689,353 B2 | 4/2014 | Bünter |
| 8,690,074 B2 * | 4/2014 | Moore ............... G05D 23/1917 236/94 |
| 8,701,210 B2 | 4/2014 | Cheng et al. |
| 8,733,667 B2 | 5/2014 | Moore et al. |
| 8,950,687 B2 | 2/2015 | Bergman |
| 8,978,994 B2 | 3/2015 | Moore et al. |
| 9,014,860 B2 | 4/2015 | Moore et al. |
| 9,201,431 B2 | 12/2015 | Lyle |
| 9,304,676 B2 | 4/2016 | Poplawski |
| 9,686,880 B1 * | 6/2017 | Khoury ................ H05K 7/1427 |
| 9,989,273 B2 | 6/2018 | Read et al. |
| 2001/0003451 A1 | 6/2001 | Armstrong |
| 2002/0065809 A1 | 5/2002 | Kitayama |
| 2002/0096572 A1 | 7/2002 | Chene et al. |
| 2004/0133314 A1 | 7/2004 | Ehlers |
| 2004/0193324 A1 | 9/2004 | Hoog |
| 2004/0230402 A1 | 11/2004 | Jean |
| 2004/0245352 A1 * | 12/2004 | Smith ................ G05D 23/1904 236/94 |
| 2004/0256472 A1 | 12/2004 | DeLuca |
| 2004/0260427 A1 | 12/2004 | Wimsatt |
| 2005/0027997 A1 * | 2/2005 | Ueno ....................... G06F 21/34 713/193 |
| 2005/0033707 A1 | 2/2005 | Ehlers |
| 2005/0040248 A1 | 2/2005 | Wacker |
| 2005/0040249 A1 | 2/2005 | Wacker |
| 2005/0044906 A1 * | 3/2005 | Spielman ........... G07C 9/00166 70/63 |
| 2005/0082836 A1 | 4/2005 | Lagerwey |
| 2005/0108620 A1 | 5/2005 | Allyn et al. |
| 2005/0119793 A1 | 6/2005 | Amundson et al. |
| 2005/0194457 A1 | 9/2005 | Dolan |
| 2005/0198591 A1 | 9/2005 | Jarrett |
| 2006/0030954 A1 | 2/2006 | Bergman |
| 2006/0290140 A1 | 6/2006 | Yoshida |
| 2006/0220386 A1 | 10/2006 | Wobben |
| 2007/0045429 A1 | 3/2007 | Chapman, Jr. |
| 2007/0045441 A1 | 3/2007 | Ashworth |
| 2007/0114291 A1 | 5/2007 | Pouchak |
| 2007/0221741 A1 | 9/2007 | Wagner |
| 2007/0228182 A1 | 10/2007 | Wagner et al. |
| 2007/0228183 A1 | 10/2007 | Kennedy |
| 2007/0257120 A1 | 11/2007 | Chapman et al. |
| 2007/0278320 A1 | 12/2007 | Lunacek et al. |
| 2008/0271475 A1 | 11/2008 | Wuesthoff |
| 2009/0001182 A1 | 1/2009 | Siddaramanna |
| 2009/0024965 A1 | 1/2009 | Zhdankin |
| 2009/0045263 A1 | 2/2009 | Mueller et al. |
| 2009/0057424 A1 | 3/2009 | Sullivan et al. |
| 2009/0057427 A1 | 3/2009 | Geadelmann |
| 2009/0062964 A1 | 3/2009 | Sullivan |
| 2009/0129931 A1 | 5/2009 | Stiesdal |
| 2009/0140056 A1 | 6/2009 | Leen |
| 2009/0140064 A1 | 6/2009 | Schultz |
| 2010/0031193 A1 | 2/2010 | Stark |
| 2010/0070089 A1 | 3/2010 | Harrod et al. |
| 2010/0117975 A1 | 5/2010 | Cho et al. |
| 2010/0127502 A1 | 5/2010 | Uchino et al. |
| 2010/0145528 A1 | 6/2010 | Bergman et al. |
| 2010/0261465 A1 | 10/2010 | Rhoads et al. |
| 2010/0318200 A1 | 12/2010 | Foslien |
| 2011/0004825 A1 | 1/2011 | Wallaert |
| 2011/0031806 A1 | 2/2011 | Altonen et al. |
| 2011/0046792 A1 | 2/2011 | Imes |
| 2011/0054710 A1 | 3/2011 | Imes |
| 2011/0112998 A1 | 5/2011 | Abe |
| 2011/0261002 A1 | 10/2011 | Verthein |
| 2011/0273394 A1 | 11/2011 | Young |
| 2012/0067561 A1 | 3/2012 | Bergman |
| 2012/0074710 A1 | 3/2012 | Yoshida |
| 2012/0131504 A1 | 5/2012 | Fadell |
| 2012/0168524 A1 | 7/2012 | Moore et al. |
| 2012/0169675 A1 | 7/2012 | Moore et al. |
| 2012/0203379 A1 | 8/2012 | Sloo |
| 2012/0221149 A1 | 8/2012 | Kasper |
| 2012/0229521 A1 | 9/2012 | Hales, IV |
| 2012/0232703 A1 | 9/2012 | Moore |
| 2012/0239221 A1 | 9/2012 | Mighdoll |
| 2012/0329528 A1 | 12/2012 | Song |
| 2013/0024685 A1 | 1/2013 | Kolavennu et al. |
| 2013/0032414 A1 | 2/2013 | Yilmaz |
| 2013/0056989 A1 | 3/2013 | Sabhapathy |
| 2013/0090767 A1 | 4/2013 | Bruck et al. |
| 2013/0123991 A1 | 5/2013 | Richmond |
| 2013/0211783 A1 | 8/2013 | Fisher et al. |
| 2013/0215088 A1 | 8/2013 | Son et al. |
| 2013/0263034 A1 | 10/2013 | Bruck |
| 2013/0338838 A1 | 12/2013 | Moore |
| 2013/0345883 A1 | 12/2013 | Sloo |
| 2014/0081465 A1 | 3/2014 | Wang et al. |
| 2014/0098247 A1 | 4/2014 | Rao |
| 2014/0152631 A1 | 6/2014 | Moore et al. |
| 2014/0156087 A1 | 6/2014 | Amundson |
| 2014/0163746 A1 | 6/2014 | Drew |
| 2014/0254577 A1 | 9/2014 | Wright et al. |
| 2014/0316581 A1 | 10/2014 | Fadell et al. |
| 2014/0319233 A1 | 10/2014 | Novotny |
| 2015/0081568 A1 | 3/2015 | Land, III |
| 2015/0095843 A1 | 4/2015 | Greborio et al. |
| 2015/0100167 A1 * | 4/2015 | Sloo ....................... F24F 11/30 700/278 |
| 2015/0167995 A1 | 6/2015 | Fadell |
| 2015/0233595 A1 | 8/2015 | Fadell |
| 2015/0280935 A1 | 10/2015 | Poplawski et al. |
| 2016/0062618 A1 | 3/2016 | Fagan |
| 2016/0123618 A1 | 5/2016 | Hester et al. |
| 2016/0124828 A1 | 5/2016 | Moore et al. |
| 2016/0131385 A1 | 5/2016 | Poplawski et al. |
| 2016/0154576 A1 | 6/2016 | Moore et al. |
| 2017/0103689 A1 | 4/2017 | Moore et al. |
| 2017/0131825 A1 | 5/2017 | Moore et al. |
| 2017/0300025 A1 | 10/2017 | Moore et al. |
| 2017/0364104 A1 | 12/2017 | Poplawski et al. |
| 2018/0005195 A1 | 1/2018 | Jacobson |
| 2018/0031266 A1 | 2/2018 | Atchison |

FOREIGN PATENT DOCUMENTS

| | | |
|---|---|---|
| JP | 2004218436 | 8/2004 |
| JP | 2006009596 | 1/2006 |
| KR | 20050034417 | 4/2005 |

OTHER PUBLICATIONS

ComfortLink II XL950 Control, User Guide, Trane U.S. Inc., 2011.
Cardio lie Installer's Guide, System Version 2.5xx, 5th edition, 2008, Secant Home Automation Inc.
What you should know about flexible displays (FAQ); http://news.cnet.com/8301-1035_3-57607171-94/what-you-should-know-about-flexible-d . . . ; Nov. 25, 2013.
Brae8urn Systems LLC, "Temperature Limiting Adjustments for heating and Cooling (1000 Series)", Mportant Installation Instructions., no date.

* cited by examiner

TAMPER RESISTANT THERMOSTAT HAVING HIDDEN LIMIT ADJUSTMENT CAPABILITIES

FIELD OF THE INVENTION

The present invention relates to a circuit board having a hidden switching mechanism for adjusting heating and cooling limits for a thermostat.

BACKGROUND OF THE INVENTION

Most residential and commercial properties have at least one thermostat managing some form of a temperature maintenance system. These systems help keep occupants and stored material in a comfortable environment.

The laws of thermodynamics dictate that temperature maintenance systems require more energy to maintain temperatures which are further from the ambient temperature of the surrounding environment. For instance, it takes less energy, and as a result, is less expensive to heat a house to 70 degrees Fahrenheit in the winter than to keep the same house at 75 degrees. Similarly, it is less expensive to cool the same house to 78 degrees Fahrenheit during the summer than to cool the house down to 72 degrees. In order to limit the costs of providing a comfortable environment within a temperature maintenance controlled building, measures are often taken to set limits on temperature ranges available for selection on a thermostat.

In addition, there are instances where occupants (such as those residing in hospitals, assist living, or nursing homes) need to be protected from setting the temperature maintenance system either too high or too low, regardless of economic efficiency.

Modern thermostats are often controlled by a plurality of "hard" and "soft" buttons. Soft buttons are touch sensitive areas on screens, and the functions of these soft buttons vary depending on the display of the screens. Hard buttons are traditional mechanical switches and buttons. Thermostats can have a variety soft and/or hard buttons having different functions. Often these buttons take the form of a "+" and a "−" system of buttons for adjusting the room temperature up or down.

These controls are sufficient to regulate the function of the thermostat, however they allow anyone with access to them to have complete control over the thermostat's settings. This allows anyone with access to the thermostat to adjust it outside of a cost effective operating temperature range, driving up the costs to heat or cool the environment and/or putting undesired stress on the temperature maintenance system. It also allows anyone with access to the thermostat, such as nursing home residents, to adjust it outside of a medically safe temperature range. The medically safe temperature range can differ from a cost effective operating temperature range.

Often it is desired that certain individuals such as tenants, college students living in dorms, and/or travelers at hotels who have no incentive or limited ability to keep the thermostat set at a cost effective range, be limited to the cost effective range. These individuals can be referred to as non-administrative users.

Similarly, it is desired that certain individuals such as hospital and/or nursing home residents who, for medical reasons be unable to set their thermostat at a safe operating range, be limited to a medically safe temperature range. These individuals can also be referred to as non-administrative users.

There have been many proposed solutions to the problem of allowing anyone with access to the thermostat to adjust it outside of a particular operating temperature range. One solution has been to require a security code to set the upper and lower limits of the thermostat's possible operating range. However, individuals can often find these codes online and/or hack the system, thus defeating the purpose of the tamper proof thermostat.

Another proposed solution involves permanently fixing the temperature range of the thermostat by having limitations on temperature within the circuit itself, which cannot be overridden. However, this solution offers no degree of flexibility if someone with the proper authority (for example a landlord or maintenance person) desires to alter these limits. Instead they would be required to purchase a whole new unit with the desired operating range.

There is a need for a tamper resistant thermostat which unauthorized individuals cannot easily override, and qualified personnel have the capability to limit as desired.

SUMMARY OF INVENTION

A circuit board is provided, having a plurality of connections. These connections interact with a temperature maintenance system, which can have a heating system, a cooling system, or both systems in some embodiments. A switching mechanism is present on the circuit board, having at least two positions. One of these positions, operation mode, enables a user to interact with a thermostat assembly associated with the circuit board to set a temperature for the temperature maintenance system to maintain. A second position, the limit setting position, allows a user to set upper and lower limits on the temperature range for when the cooling system is active, and/or upper and lower limits on the temperature range for when the heating system is active. The circuit board includes at least one associated hardware component, which can include but is not to be limited to a display, at least one hard button, at least one soft button, and/or a wireless communication system.

In many embodiments, this circuit board is mounted in a thermostat housing, and this forms a thermostat assembly. The switching mechanism can take on a plurality of forms depending on the chosen embodiment. In some embodiments, the switching mechanism comprises a removable jumper, wherein the jumper can be removed from a first position and replaced in a second position, the first position being a limit setting position and the second being a thermostat operation position.

In some embodiments, the switching mechanism comprises a removable jumper, wherein the jumper is removed by default, and replaced to enable the hidden menu system, the installed position being a limit setting position and the removed position being a thermostat operation position.

In some embodiments, the switching mechanism comprises at least a two-way switch, wherein the switch can be moved from a limit setting position to a thermostat operation position.

There is a method for adjusting the temperature ranges in the heating system and/or the cooling system via interaction with a hidden menu system. This hidden menu system gives a user the capability to adjust an upper temperature limit and a lower temperature limit for the heating system, the cooling system, or both. This method includes accessing the switching mechanism, either physically or by remote methods as is dictated by the switching mechanism in the given embodiment. Once interaction has been made with the switching mechanism to change from operation to limit setting mode, the hidden menu system is revealed. The user then navigates this system to adjust upper and lower temperature limits of the heating and/or cooling system using a set of controls. These controls are either attached to the circuit board, or are part of a device interacting with the circuit board remotely.

The system will either automatically exit limit setting mode after a period of time without interaction, or can exit limit setting mode by the user reverting the switching mechanism back to operation position. In some embodiments, where the switching mechanism is physically hidden, the user has to remove components of a thermostat housing to access the switching mechanism. These components are then replaced after adjustments are made to hide the switching mechanism.

In at least some embodiments, a thermostat assembly includes a display screen and a circuit board contained within a housing. The thermostat can provide one or more hard buttons for user interface, and/or can also provide a number of soft buttons depending on the layout of the display. The hard and/or soft buttons can interact with the circuit board.

In some embodiments, a switching mechanism is present on a circuit board. In some embodiments, this circuit board includes a configuration circuit designed to allowing the switching mechanism to change to display from a limit setting to an operation mode.

The thermostat controls an associated temperature maintenance system having a heating system, cooling system, or both. A user is able to interact with the thermostat to alter the temperature of their surrounding environment. In many cases, these users are non-administrative users.

In some embodiments, the thermostat operates via the interaction of its hardware and associated software.

In some embodiments, the thermostat housing can take a variety of forms, provided that the housing can effectively contain and conceal the circuit board, and provide a display. In some embodiments, the thermostat can have a series of hard buttons and/or soft buttons.

The thermostat housing can be made of, among other materials, plastics such as Acrylonitrile Butadiene Styrene or High Impact Polystyrene.

In some embodiments, the main hardware component of the thermostat comprises a circuit board having at least one circuit designed to operate the associated temperature maintenance system according to user input. This circuit board is configured to interact with, among other things, the display, possible hard and/or soft buttons, the corresponding temperature maintenance system, and/or a wireless communication system so that the thermostat can be remotely adjusted. A component of this circuit board is the aforementioned switching mechanism.

DETAILED DESCRIPTION OF PREFERRED EMBODIMENT(S)

Figure 1:
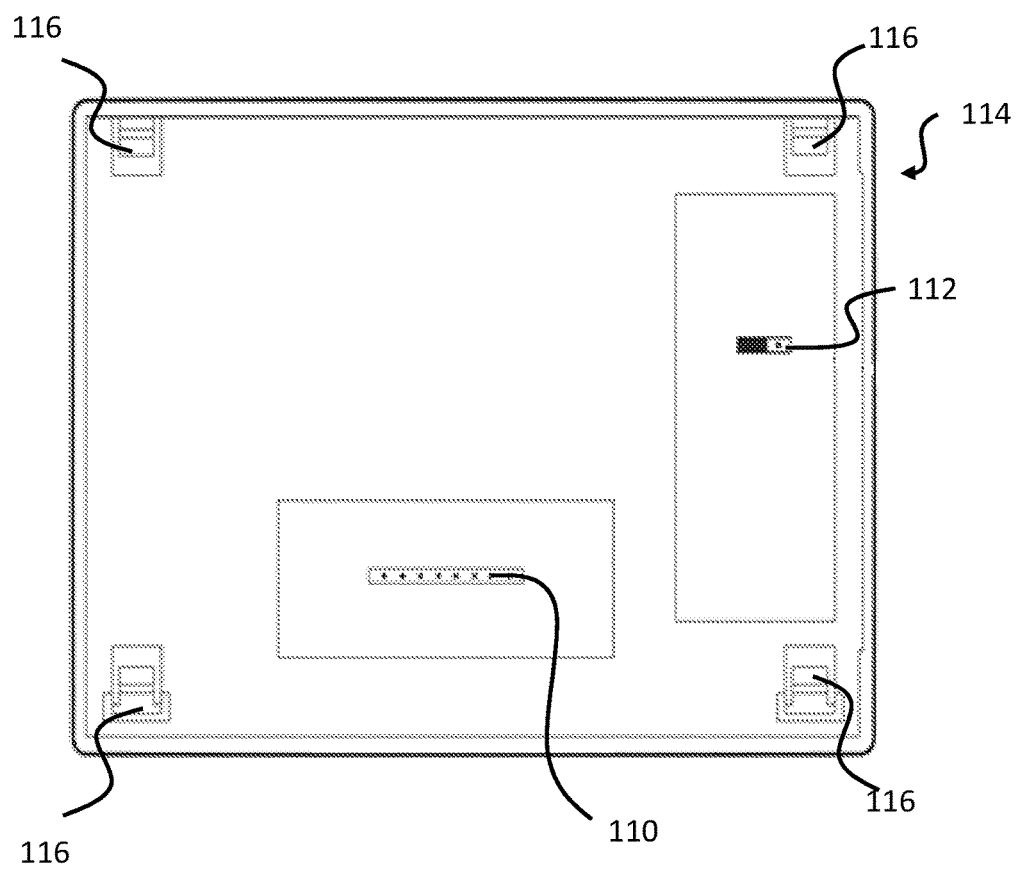
FIG. 1 is a back elevation view of a thermostat housing with a rear panel removed, showing a removable jumper, wherein the jumper can be moved from a first position and placed in a second position, the first position being a limit setting position and the second being a thermostat operation position.

Turning first to FIG. 1, thermostat housing 114 is shown with a rear panel removed (not shown) allowing access to switching mechanism 112. In FIG. 1, switching mechanism 112 is a removable jumper, wherein the removable jumper can be moved from a first position and placed in a second position, the first position being a limit setting position and the second being a thermostat operation position.

Switching mechanism 112 can take the form of a variety of embodiments. In at least some embodiments, switching mechanism 112 is housed inside thermostat housing 115 on circuit board 300 (see FIG. 3) and switching mechanism 112 can toggle between at least two modes. In one of these modes, "limit setting" (henceforth referred to as LS), an administrator (such as maintenance personnel) can navigate through a variety of screens such as, but not limited to, those indicated by FIG. 2. While in LS mode, an administrator can adjust the minimum and maximum allowable temperatures for the temperature maintenance system. In some embodiments, this is done through displays such as those shown in FIG. 5A-FIG. 6B. When the switching mechanism is reverted to "operation mode" (henceforth referred to as OP), an operator (either an administrator or a non-administrative user) can adjust the temperature of the environment, provided that the adjustment is within the preset limits defined in LS mode.

In some embodiments, switching mechanism 112 comprises a removable jumper. The jumper can be placed in one of at least two configurations once an operator has gained access to the circuit board. In the first configuration, the jumper enables the display and buttons to a first circuit, which allows an administrator to set upper and lower limits on thermostat temperature. In this first configuration, the switching mechanism is in LS mode.

When the jumper is placed in its second configuration, the display and hard or soft buttons are connected to a second circuit, wherein the second circuit allows a user (either an administrator or a non-administrative user) to adjust the temperature the user seeks to maintain. This temperature setting is confined to the temperature range between the upper and lower limits on temperature set in LS mode when the jumper was in a first configuration and connected to the first circuit.

In these embodiments, wherein switching mechanism 112 comprises a removable jumper, the jumper is constructed having two connection points. In some embodiments, the jumper comprises a series of two contacts having at least one female receptacle each, and these female receptacles are received by corresponding male contacts 310 on circuit board 300. The two female contacts are connected via a conductive medium, such that when both contacts are interacting with their respective male contacts 310, a circuit governing the mode of the thermostat is completed.

In some embodiments, where switching mechanism 112 comprises a two way switch, the switch can be placed in one of two configurations once a user has gained access to the circuit board. In the first configuration, the switch connects the display and buttons to a first circuit, which allows an administrator to set upper and lower limits on thermostat temperature. In this first configuration, switching mechanism 112 is in LS mode. However, when the switch is placed in its second configuration, the display and buttons are connected to a second circuit, wherein the second circuit allows a user (either an administrator or a non-administrative user) to adjust the temperature the user seeks to maintain. This temperature setting is confined to the temperature range between the upper and lower limits on temperature set in LS mode when the toggle was in a first configuration and connected to the first circuit. In some embodiments, other two way switches can be used to accomplish the same function, such as switches requiring keys.

In some embodiments, switching mechanism 112 comprises a lock and key switch, wherein the key interacts with the lock so that it can be moved from a limit setting position to a thermostat operation position. In some embodiments, the key can be one or more of a jumper wire, special shape molded plastic part, USB key, or other non-traditional key.

In some embodiments, switching mechanism 112 includes a biometric identification system, wherein the biometric identification system can use retinal, iris, fingerprint, facial recognition, voice recognition, or other biometric identification methods such as palm vein analysis to identify the user. If the user is a verified administrator, they enable the hidden menu system allowing the upper and lower limits of the thermostat's temperature heating and or cooling range to be adjusted. In embodiments wherein the circuit board is contained by a thermostat housing, these biometric identification systems can protrude through the housing for easy access.

In embodiments involving biometric identification options, these identification procedures (such as fingerprint or voice recognition) can either function as switching mechanism 112 itself (wherein identifying oneself activates the switching mechanism) or can function as a security measure to grant access to the switching mechanism itself.

In some embodiments, the switching mechanism can comprise RFID, geo-fencing, or WiFi interaction systems to allow an administrator to authenticate oneself and/or adjust the temperature maintenance system remotely.

In FIG. 1, thermostat housing 114 is configured to connect to a rear panel via hooks 116. In some embodiments wherein the circuit board unit is removed from a mounting plate containing its primary source of power to access switching mechanism 112, the circuit board can be powered by a supplemental power system.

In some embodiments, power is supplied to the circuit board by a wall connection through connector 110. In some embodiments, a supplemental power system can temporarily provide power to the circuit board, for example when the thermostat is disconnect from connector 110. In some embodiments, the supplemental power system can include, but is not limited to, at least one capacitor and/or at least one battery.

Figure 4:
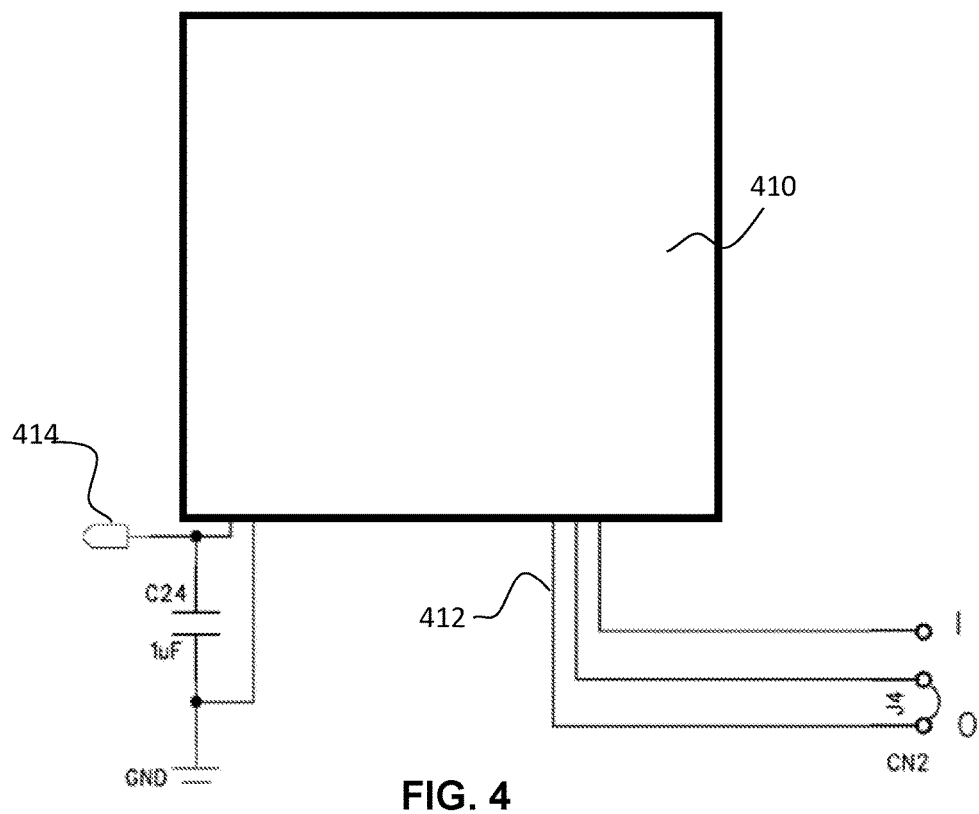
FIG. 4 is a circuit diagram of a circuit board.

In some embodiments, switching mechanism 112 is directly coupled to microprocessor 410 (see FIG. 4). When switching mechanism 112 is activated the limit set menus are revealed. Switching mechanism 112 interacts with at least one port on microprocessor 410. An example of this interaction is illustrated by connection 412. Microprocessor 410 is connected to a power source in some embodiments. An example of this circuit is shown as element 414. This power source can include a connection to a direct or alternating current source through connector 110. In some embodiments, the power source can also contain capacitors or on board batteries.

Figure 2:
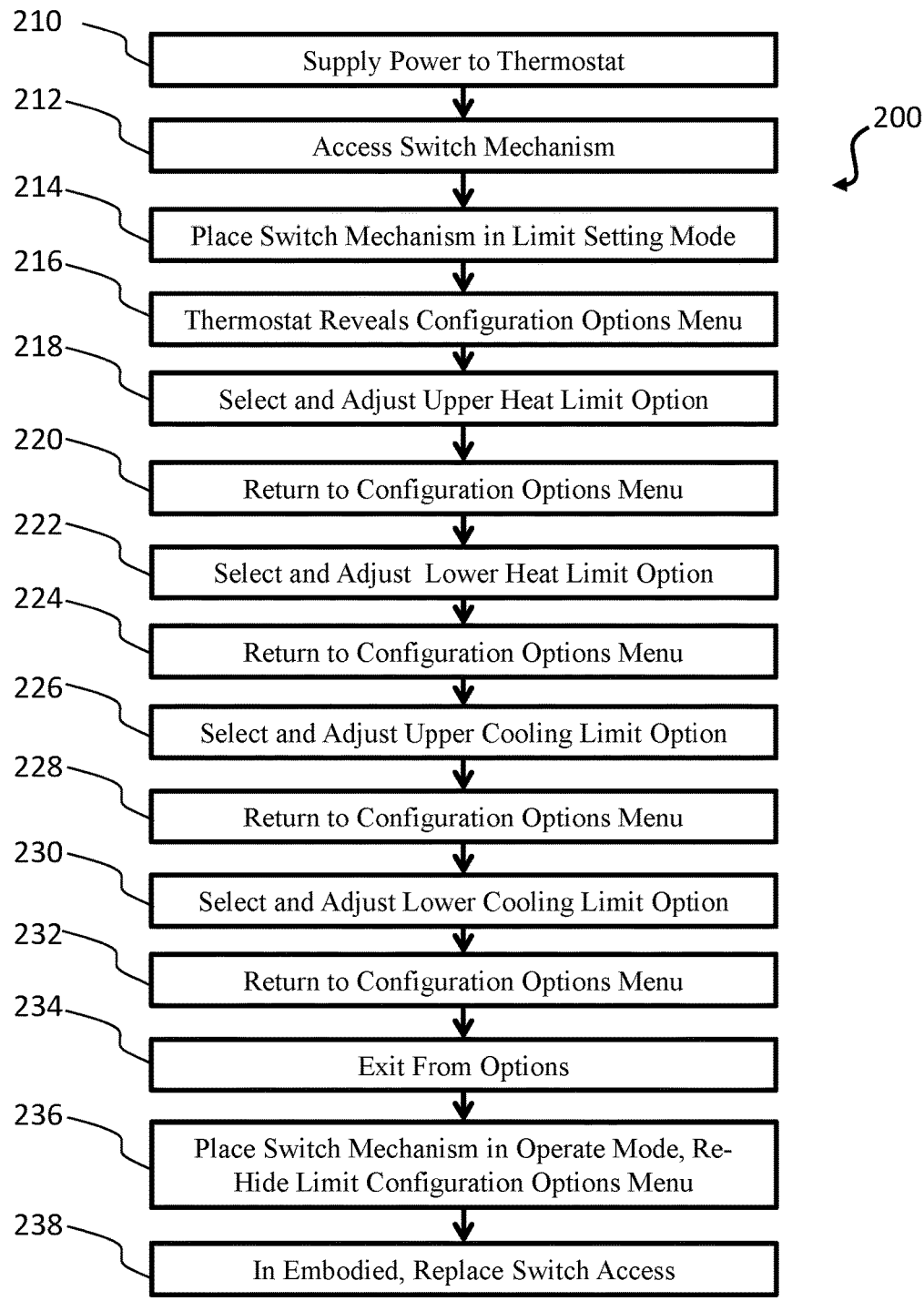
FIG. 2 is a flow chart showing a method of setting a thermostat's temperature limits.
Figure 3:
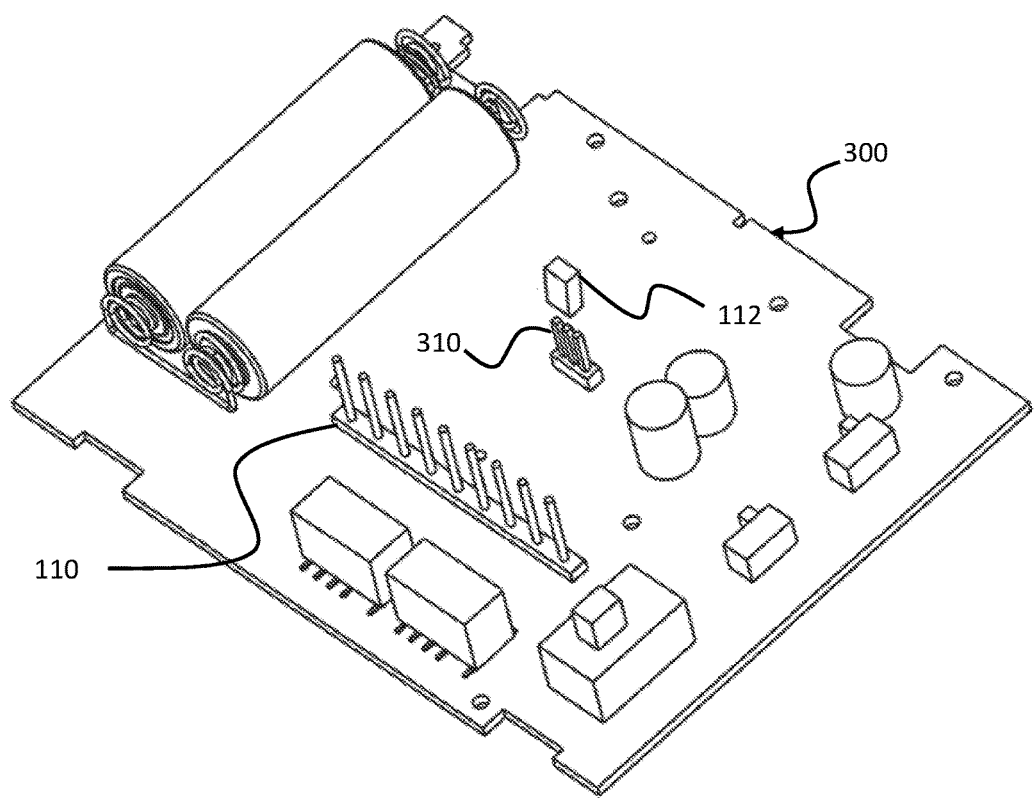
FIG. 3 is a perspective view of a circuit board showing the position of the switching mechanism, wherein the switching mechanism comprises a repositional jumper, wherein the jumper can be moved from a first position and placed in a second position.

FIG. 2 is a flow diagram of method 200 for configuring the thermostat according to some embodiments. Method 200 starts at 210 which involves supplying power to the thermostat. In some embodiments, the power is supplied via a supplemental power source such as a battery.

At 212, an administrator accessing the switch mechanism.

At 214, the administrator places the switch mechanism into the limit setting mode. In some embodiments, this is done by removing a jumper into a limit setting position.

At 216, the thermostat reveals a configuration options menu to the administrator. In some embodiments, LS mode is entered automatically when the thermostat detects that the limit adjustment circuit has power and is being routed to the display, and the configuration menu is immediately displayed. In other embodiments, interaction with hard or soft buttons in addition to the repositioning of the jumper is are used to locate a configuration menu. Once LS mode is entered, the administrator can adjust the lower heating limit, upper heating limit, lower cooling limit, and upper cooling limit through the configuration menu.

In some embodiments, the thermostat can have default limits. In certain embodiments, the default lower limits are both set to 45 degrees Fahrenheit, and the upper limits are both set to 90 degrees Fahrenheit. In some embodiments, the default limits are dependent on the time of day or calendar. In some embodiments, the default heating high limit during the summer calendar would be lower than winter calendar months.

At 218, the administrator can select and adjust the upper heat limit option.

At 220, the administrator returns to the configuration options menu.

At 222, the administrator adjusts the lower heating limit option.

At 224, the administrator returns to the configuration options menu.

At 226, the administrator selects and adjusts the upper limit cooling option.

At 228, the administrator returns to the configuration options menu.

At 230, the administrator selects and adjusts the lower cooling limit.

At 232, the administrator returns to the configuration options menu.

At 234, the administrator exits the configuration options menu.

At 236, the switching mechanism is then returned to operation mode, thus hiding the limit configuration options menu.

At 238, the switch access is then replaced.

In at least some embodiments, various steps listed above can be performed in a different order that is consistent with the switching mechanism and menu setup and/or some steps can be left out altogether.

In embodiments, where the thermostat has scheduling capabilities, wherein different limits on allowable temperatures can be set based on pre-determined dates, days, time slots and the like, the administrator can set these limits according to scheduling needs while the switching mechanism is in LS mode from the configuration menu. In some embodiments, the administrator can select individual time slots from the configuration menu, and then proceed to set temperature limits for those slots. In other embodiments, the menu structure can involve the administrator setting default limits for all or some time slots, and then adjusting specific timeslots to meet the demands of the administrator. In some embodiments, the administrator can use the provided hard and/or soft buttons present on the thermostat display and housing to choose which limits to adjust, and can then set them accordingly.

Figure 5A:
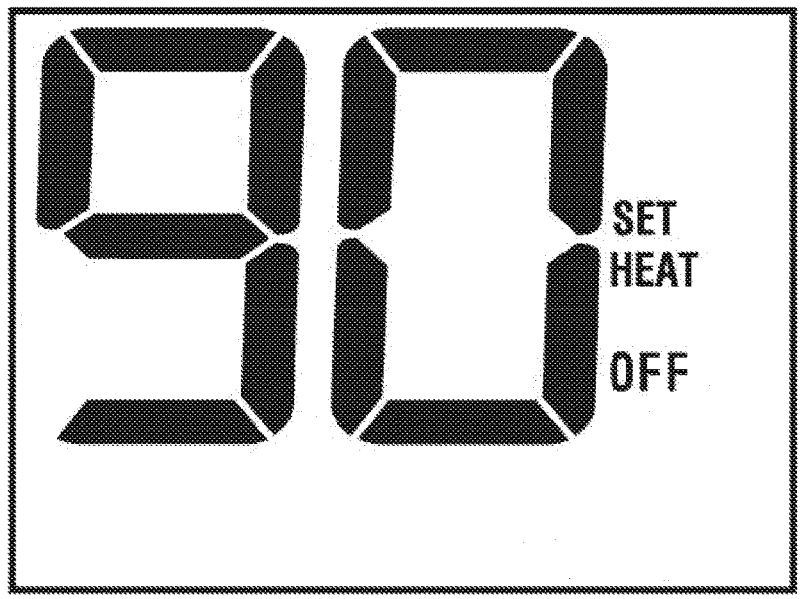
FIG. 5A and FIG. 5B are screenshots of a thermostat display which allow for adjusting the upper and lower heating limits. These screenshots are accessible when the thermostat is in a limit setting mode.
Figure 5B:
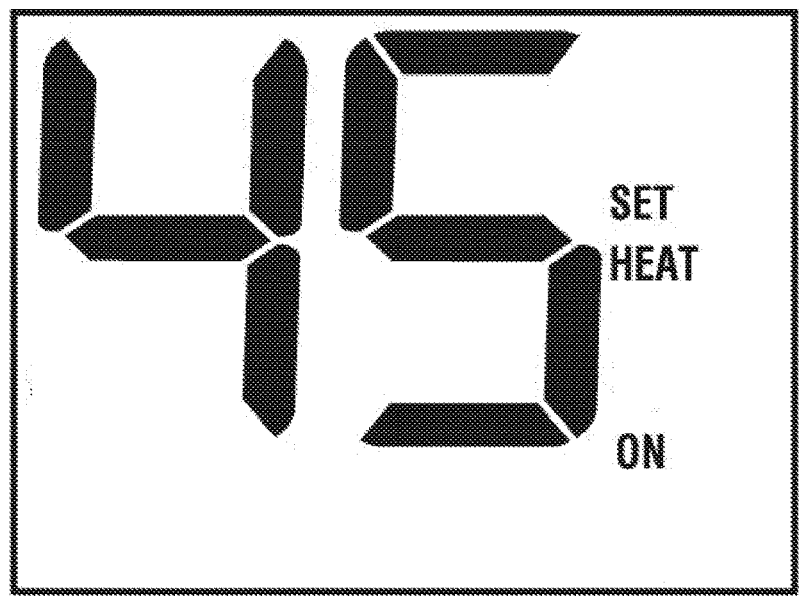
Figure 6A:
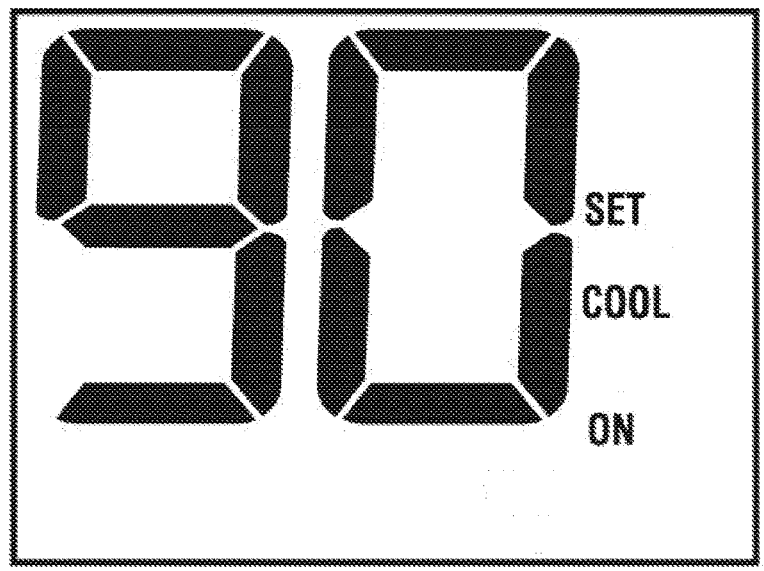
FIG. 6A and FIG. 6B are screenshots of a thermostat display which allow for adjusting the upper and lower cooling limits. These screenshots are accessible when the thermostat is in a limit setting mode.
Figure 6B:
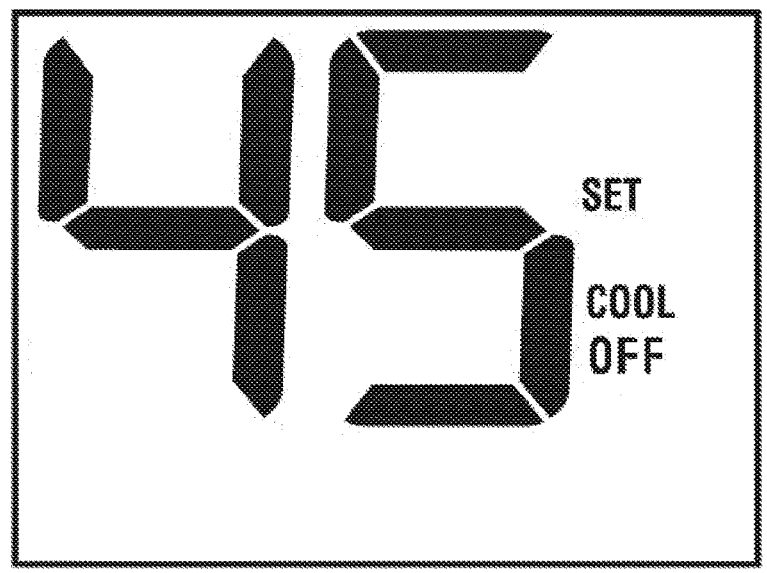

FIG. 5A and FIG. 5B shows potential display configurations for adjusting the upper and lower heating limits. Similarly, FIG. 6A and FIG. 6B shows potential display configurations for adjusting the upper and lower cooling limits.

In some embodiments, a non-administrative user can temporarily override the temperature settings. In some embodiments, the temporary override is enabled via Wi-Fi or other remote control of the thermostat such as geo-fencing.

While particular elements, embodiments and applications of the present invention have been shown and described, it will be understood, that the invention is not limited thereto since modifications can be made without departing from the scope of the present disclosure, particularly in the light of the foregoing teachings.

What is claimed is:

1. A circuit board comprising:
    a. a plurality of connections, said plurality of connections interacting with a temperature maintenance system having at least one of a heating system and a cooling system;
    b. a switching mechanism having an operation position and a limit setting position, said switching mechanism at said limit setting position enabling an administrator user to adjust an upper temperature limit and a lower temperature limit for the at least one of said heating system and said cooling system, wherein said upper temperature limit and said lower temperature limit form an operating temperature range of selectable temperature corresponding to said operation position, wherein only temperature within said operating temperature range is selectable when said switching mechanism is at said operation position; and
    c. at least one hardware component selected from the group consisting of displays, at least one hard button, at least one soft button, and a wireless communication system.

2. The circuit board of claim 1, wherein said circuit board is mounted in a thermostat housing to form a thermostat assembly.

3. The circuit board of claim 1, wherein said switching mechanism comprises a removable jumper, wherein said removable jumper is configured to move between said limit setting position to said operation position.

4. The circuit board of claim 1, wherein said switching mechanism comprises a removable jumper, wherein said limit setting position is accessed by inserting said removable jumper into a receiver.

5. The circuit board of claim 1, wherein said switching mechanism comprises a two-way switch.

6. The circuit board of claim 1, wherein said switching mechanism comprises a lock and key switch, wherein a key interacts with a lock so that said lock can be moved from said limit setting position to said operation position.

7. The circuit board of claim 1, wherein said switching mechanism comprises a biometric identification system.

8. The circuit board of claim 1, wherein said switching mechanism comprises an RFID identification system.

9. The circuit board of claim 1, wherein said switching mechanism comprises a USB key identification system.

10. The circuit board of claim 1 wherein said switching mechanism at said limit setting position enables access to a hidden menu system by said administrator user to adjust said upper temperature limit and said lower temperature limit.

11. A method for adjusting a temperature range in a thermostat controlling a temperature maintenance system having at least one of a heating system and a cooling system comprising:
    a. accessing a switching mechanism on a temperature control circuit;
    b. changing said switching mechanism from an operation position to a limit setting position; wherein said limit setting position provides access to a hidden menu system configured to provide the ability to adjust an upper temperature limit and a lower temperature limit for at least one of said heating system and said cooling system;
    c. navigating said hidden menu system, wherein said upper temperature limit and said lower temperature limit form an operating temperature range of selectable temperature corresponding to said operation position, wherein only temperature within said operating temperature range is selectable when said switching mechanism is at said operation position; and
    d. adjusting said upper temperature limit and said lower temperature for at least one of said heating system and said cooling system.

12. The method of claim 11, further comprising:
    a. hiding said hidden menu system by reverting said switching mechanism to said operation position.

13. The method of claim 11, further comprising:
    a. hiding said hidden menu system automatically after a given period of time.

14. The method of claim 11, wherein accessing said switching mechanism comprises remotely triggering said switching mechanism by means of RFID identification.

15. The method of claim 11, wherein accessing said switching mechanism comprises remotely triggering said switching mechanism by means of a geo-fencing mechanism.

16. The method of claim 11, wherein accessing said switching mechanism comprises remotely triggering said switching mechanism by means of a transceiver and a corresponding device.

17. The method of claim 11, wherein said temperature control circuit is affixed to a device interacting with a transceiver, such that said method can be accomplished remotely.

18. The method of claim 11, wherein accessing said switching mechanism comprises interacting with a biometric identification system.

19. The method of claim 18, wherein said biometric identification system is configured to utilize voice recognition.

20. The method of claim 18, wherein said biometric identification system is configured to utilize fingerprint data.

* * * * *